(12) United States Patent
Ryu et al.

(10) Patent No.: US 11,351,858 B2
(45) Date of Patent: Jun. 7, 2022

(54) STIFFNESS REINFORCEMENT STRUCTURE FOR FUEL TANK OF VEHICLE

(71) Applicants: HYUNDAI MOTOR COMPANY, Seoul (KR); KIA MOTORS CORPORATION, Seoul (KR)

(72) Inventors: Bu Yeol Ryu, Hwaseong-si (KR); Tac Koon Kim, Seoul (KR); Hyun Do Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 379 days.

(21) Appl. No.: 16/685,293

(22) Filed: Nov. 15, 2019

(65) Prior Publication Data

US 2020/0369146 A1 Nov. 26, 2020

(30) Foreign Application Priority Data

May 22, 2019 (KR) ........................ 10-2019-0059823

(51) Int. Cl.
*B60K 15/067* (2006.01)
*B60K 15/03* (2006.01)
*F16M 13/02* (2006.01)

(52) U.S. Cl.
CPC ...... *B60K 15/067* (2013.01); *B60K 15/03177* (2013.01); *F16M 13/022* (2013.01); *B60K 2015/03453* (2013.01); *B60Y 2200/92* (2013.01)

(58) Field of Classification Search
CPC ............ B60K 15/077; B60K 15/03177; B60K 2015/0775; B60K 2015/0344; B60K 2015/03467
See application file for complete search history.

(56) References Cited

U.S. PATENT DOCUMENTS

| | | | | |
|---|---|---|---|---|
| 6,135,306 A | * | 10/2000 | Clayton | ........... B60K 15/03177 220/653 |
| 6,338,420 B1 | * | 1/2002 | Pachciarz | ........ B60K 15/03177 220/4.13 |
| 9,731,866 B2 | * | 8/2017 | Quant | .................... B65D 51/16 |
| 2011/0226777 A1 | * | 9/2011 | Asahara | ........... B60K 15/03177 220/562 |
| 2016/0243930 A1 | * | 8/2016 | Criel | ................ B60K 15/03177 |

* cited by examiner

*Primary Examiner* — Andrew T Kirsch
(74) *Attorney, Agent, or Firm* — Morgan, Lewis & Bockius LLP

(57) ABSTRACT

A stiffness reinforcement structure for a fuel tank of a vehicle includes: a reinforcing column having an upper opening and a lower opening, and side openings arranged at both sides of an upper end and both sides of a lower end thereof; sliders fastened to the side openings of the reinforcing column; an upper thermal bonding member inserted in the upper opening and fastened to corresponding sliders; a lower thermal bonding member inserted in the lower opening of the reinforcing column and fastened to corresponding sliders with a bottom thermally bonded to an inner side of the fuel tank; and springs wound around outer sides of the reinforcing column and the sliders and providing elastic compression force to the upper thermal bonding member and the lower thermal bonding member.

13 Claims, 7 Drawing Sheets

[FIG. 1]

-Prior Art-

STIFFNESS REINFORCEMENT STRUCTURE FOR FUEL TANK OF VEHICLE

CROSS REFERENCE TO RELATED APPLICATION

The present application claims priority to Korean Patent Application No. 10-2019-0059823, filed on May 22, 2019 in the Korean Intellectual Property Office, the entire contents of which is incorporated herein by reference.

TECHNICAL FIELD

The present disclosure relates to a stiffness reinforcement structure for a fuel tank of a vehicle, and more particularly, to a stiffness reinforcement structure for a fuel tank of a vehicle, the structure being able to secure stiffness in positive pressure and negative pressure states of a fuel tank and being able to prevent damage that causes oil leakage in a collision accident.

BACKGROUND

In general, when the engine of a gasoline vehicle is operated and engine negative pressure is applied to a fuel tank through a canister, evaporation gas in the fuel tank is collected in the canister and the evaporation gas collected in the canister is sent into the combustion chamber of the engine by the engine negative pressure and burned therein, whereby it is possible to satisfy the evaporation gas emission regulations.

However, in a hybrid vehicle, when only a motor for driving is operated, engine negative pressure by operation of an engine cannot be used, so that there is a disadvantage in that evaporation gas in a fuel tank is not collected well in a canister.

In order to solve this disadvantage, the fuel tanks of hybrid vehicles are made of plastic in sealed structures.

However, when the internal pressure of these fuel tanks is increased by an increase in external atmosphere temperature, a problem of deformation of the fuel tanks made of plastic occurs.

Accordingly, stiffness reinforcement members are installed in the fuel tanks to prevent deformation of the fuel tanks.

Figure 1:
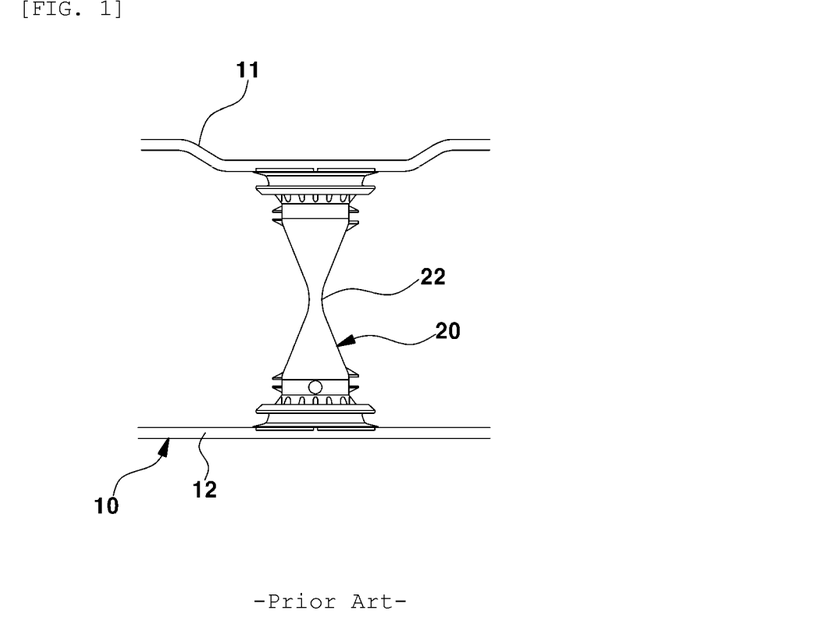
FIG. 1 is a cross-sectional view showing an example of an existing stiffness reinforcement member that is installed in a fuel tank.

FIG. 1 of the accompanying drawings shows an example of an existing stiffness reinforcement member that is installed in a fuel tank.

As shown in FIG. 1, a reinforcing column 20 is disposed between a top plate 11 and a bottom plate 12 of a fuel tank 10.

That is, the top and bottom of the reinforcing column 20 are integrally thermally bonded to the top plate 11 and the bottom plate 12 of the fuel tank 10, respectively, by thermal bonding etc.

In particular, considering that the reinforcing column 20 should be manufactured in a structure that can induce fracture by absorbing shock in a car collision under safety laws and regulations, a concave facture induction portion 22 is formed at the middle portion of the reinforcing column 20.

Accordingly, when large shock such as a car collision is applied to the fuel tank 10 made of plastic, the fuel tank 10 absorbs shock while deforming and the fracture induction portion 22 of the reinforcing column 20 absorbs shock while breaking.

However, if the stiffness of the reinforcing column 20 is excessively high, there is a problem in that when a large shock such as a car collision is applied to the plastic fuel tank 10, the fraction induction portion 22 does not fracture and the thermally bonding portion between the top plate 11 of the fuel tank 10 and the top of the reinforcing column 20 or the thermally bonding portion between the bottom plate 12 of the fuel tank 10 and the bottom of the reinforcing column 20 is broken (torn), such that fuel in the fuel tank leaks.

On the contrary, if the stiffness of the reinforcing column 20 is excessive small, there is a problem in that the fracture induction portion 22 is easily damaged even only by negative pressure generated in the fuel tank, so that the fuel tank is excessively deformed.

SUMMARY

The present disclosure has been made in an effort to solve the problems and an object of the present disclosure is to provide a stiffness reinforcement structure for a fuel tank of a vehicle, the structure being improved to secure stiffness of a stiffness reinforcement column mounted in a plastic fuel tank in a positive pressure state of the fuel tank and an engine negative pressure state, being able to induce fracture due to shock such as a car collision, and being able to prevent bursting at portions where the structure is thermally bonded to top and bottom plates of the fuel tank.

In order to achieve the above object, a stiffness reinforcement structure for a fuel tank of a vehicle according to an exemplary embodiment of the present disclosure includes: a reinforcing column having an upper opening and a lower opening respectively formed at an upper portion and a lower portion thereof, and having side openings formed at both sides of an upper end and both sides of a lower end thereof; sliders horizontally movably fastened to the side openings of the reinforcing column; an upper thermal bonding member inserted in the upper opening of the reinforcing column and fastened to corresponding sliders with a top thermally bonded to an inner side of a fuel tank; a lower thermal bonding member inserted in the lower opening of the reinforcing column and fastened to corresponding sliders with a bottom thermally bonded to an inner side of the fuel tank; and springs wound around outer sides of the reinforcing column and the sliders and providing elastic compression force to the upper thermal bonding member and the lower thermal bonding member through the sliders.

The reinforcing column may include a first body and a second body that have a semicircular cross-section and are fastened to each other, and pluralities of hooks and hook fastening holes for coupling may be integrally formed at the first body and the second body.

A plurality of horizontal guides vertically spaced apart from each other may be formed on both sides of the side openings of the reinforcing column, and horizontal guide grooves for horizontal movement of the sliders may be formed each between the horizontal guides.

Guide protrusions that are slidably inserted in the horizontal guide grooves may be formed on both outer sides of the sliders.

Fastening grooves for fastening to the upper thermal bonding member and the lower thermal bonding member may be formed on inner sides of the sliders.

Fastening flanges inserted in the fastening grooves may be formed around the upper thermal bonding member and the lower thermal bonding member.

Separation induction protrusions being in close contact with outer sides of the upper thermal bonding member and the lower thermal bonding member may be formed on the inner sides under the fastening grooves of the sliders.

A thermal bonding plate for thermal bonding to the fuel tank may be formed at an upper end of the upper thermal bonding member, and a thermal plate for thermal bonding to the fuel tank may be formed at a lower end of the lower thermal bonding member.

The side openings formed at both sides of the upper end of the reinforcing column may be open to the left and right, and the side openings formed at both sides of the lower end of the reinforcing column may be open to the front and rear.

Sliders fastened to the side openings that are open to the left and right may be moved left and right in a collision, and the sliders fastened to the side openings that are open to the front and rear may be moved forward and rearward in a collision.

Spring insertion grooves in which the springs are inserted may be formed around the outer sides of the reinforcing column and the sliders.

An upper compression support surface that a bottom edge of the upper thermal bonding member is in close contact with may be formed on an inner side of an upper end portion of the reinforcing column, and a lower compression support surface that a top edge of the lower thermal bonding member is in close contact with may be formed on an inner side of a lower end portion of the reinforcing column.

A separation direction guide pipe extending inside a center portion of the reinforcing column may be formed on each of a bottom of the upper compression support and a top of the lower compression support, and an outer diameter of the separation direction guide pipe may be smaller than an inner diameter of the center portion of the reinforcing column.

The present disclosure can provide the following effects from the objects described above.

First, it is possible to maintain stiffness of a stiffness reinforcement column in a positive pressure state of the fuel tank and an engine negative pressure state, so that it is possible to prevent deformation of the fuel tank.

Second, even if shock (bursting pressure) such as a car collision is applied to the fuel tank and the reinforcing column, the reinforcing column can be induced to separate from the top plate and the bottom plate of the fuel tank while absorbing shock. Further, it is possible to keep the upper thermal bonding member and the lower thermal bonding member of the reinforcing column thermally bonded to the top plate and the bottom plate of the fuel tank.

Third, since the upper thermal bonding member and the lower thermal bonding member of the reinforcing column keep thermally bonded to the top plate and the bottom plate of the fuel tank with shock (bursting pressure) such as a car collision applied, it is possible to easily prevent the problem of oil leakage at thermal bonding portions of a fuel tank due to bursting.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings.

FIGS. 2 to 5 show a stiffness reinforcement structure for a fuel tank of a vehicle, in which reference numeral '100' indicates a reinforcing column.

Figure 2:
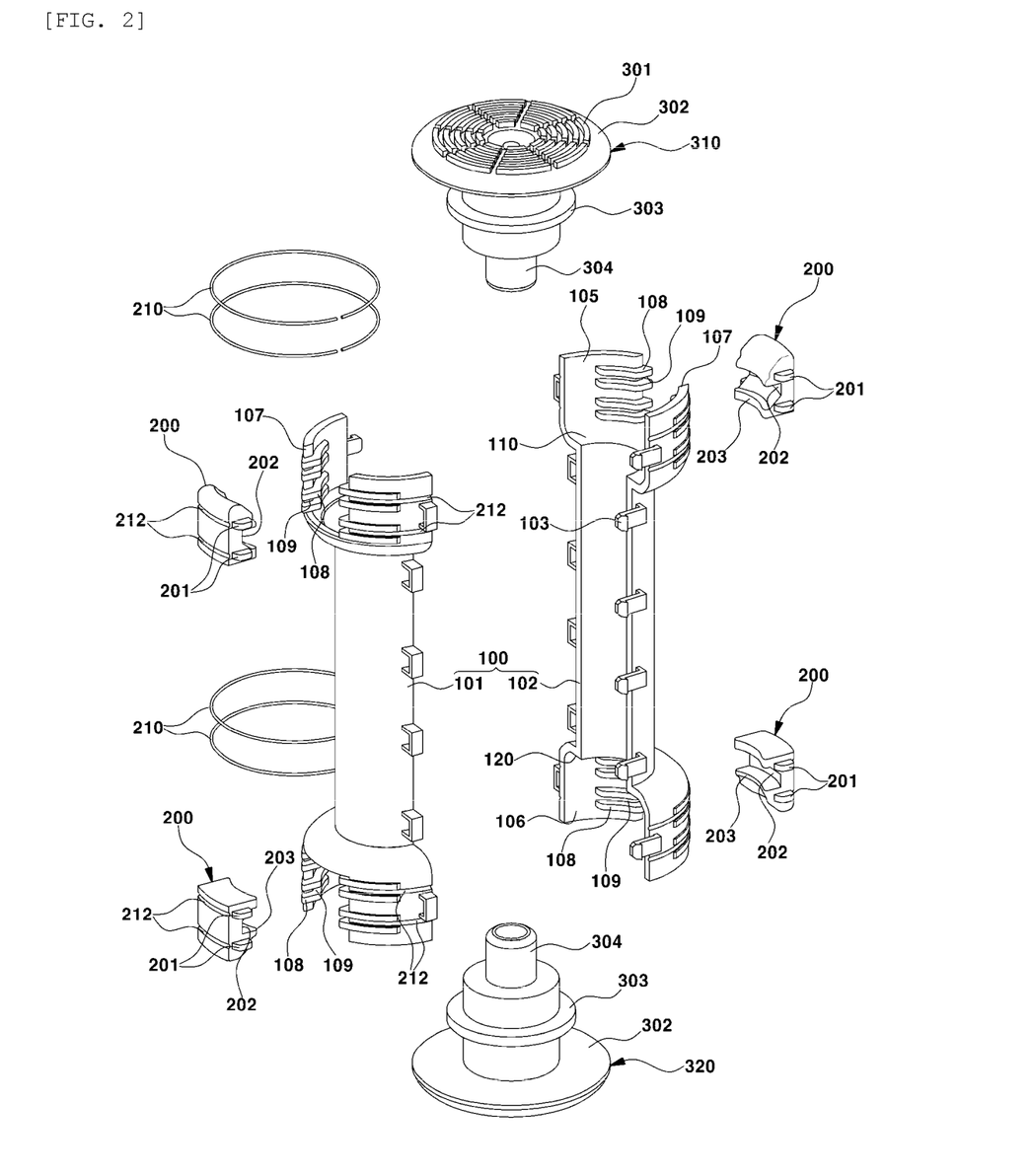
FIG. 2 is an exploded perspective view showing a stiffness reinforcement structure for a fuel tank of a vehicle according to an exemplary embodiment of the present disclosure.

The reinforcing column 100, as shown in FIG. 2, is composed of a first body 101 and a second body 102 that have a semicircular cross-section and a predetermined length. Pluralities of hooks 103 and hook coupling holes 104 that are coupled to each other are integrally formed at both side ends of the first body 101 and the second body 102.

The first body 101 and the second body 102 are fastened to each other by inserting the hooks 103 in the hook coupling holes 104, thereby providing the reinforcing column 100 having a cylindrical structure.

Obviously, in addition to the coupling the hooks 103 to the hook coupling holes 104, the first body 101 and the second body 102 can be fastened to each other using various fastening methods that use bolts, pins, clips, etc.

An upper opening 105 and a lower opening 106 are formed at the upper portion and the lower portion of the reinforcing column 100 assembled as described above, and a side opening 107 is formed at both sides of the upper end and at both sides of the lower end.

Sliders 200 that are slid by shock such as a car collision are fastened to the side openings 107 of the reinforcing column 100 to be able to horizontally move.

To this end, a plurality of horizontal guides 108 protruding and vertically spaced apart from each other is formed on both sides of the side openings 107 of the reinforcing column 107, and horizontal guide grooves 109 for horizontal movement of the sliders 200 are formed each between the horizontal guides 108.

Further, guide protrusions 201 that are slidably inserted in the horizontal guide grooves 109 formed at the side openings 107 integrally protrude from both outer sides of the sliders 200.

A pair of spring insertion grooves 212 for inserting springs 210 is circumferentially formed on the outer sides of the reinforcing column 100 and the sliders 200.

Accordingly, by inserting the springs 210 in the spring insertion grooves 212, the reinforcing column 100 and the sliders 200 are bound in a single unit by elastic compression force of the springs 210.

Accordingly, when shock such as a car collision is transmitted to the slider 200, the guide protrusions 201 of the slider 200 slide outward along the horizontal guide grooves 109 formed at the side opening 107 and force by the movement of the slider 200 is transmitted to the springs 210, whereby the springs 210 can be extended.

On the other hand, a concave fastening groove 202 for fastening an upper thermal bonding member 310 and a lower thermal bonding member 320 is formed on the inner side of the slider 200, and a separation induction protrusion 203 being in contact with the outer sides of the upper thermal bonding member 310 and the lower thermal bonding member 320 is formed on the inner side under the fastening groove 202.

The upper thermal bonding member 310 is fastened to corresponding sliders 200 by being inserted through the upper opening 105 of the reinforcing column 100 and the lower thermal bonding member 320 is fastened to corresponding sliders 200 by being inserted through the lower opening 106 of the reinforcing column 100.

For reference, the upper thermal bonding member 310 and the lower thermal bonding member 320 are the same in shape and structure, but are different only in the assembly direction.

In more detail, the upper thermal bonding member 310 and the lower thermal bonding member 320 are cylindrical members each having a plurality of thermal bonding protrusions 301 and a thermal bonding plate 302 for thermal bonding to a fuel tank at the upper end and the lower end, respectively. Further, a protrusive fastening flange 303 that is inserted in the fastening groove 202 of the slider 200 is circumferentially formed on the upper thermal bonding member 310 and the lower thermal bonding member 320.

Further, a separation direction guide pipe 304 extending inside the center portion of the reinforcing column 100 is formed at the lower end of the upper thermal bonding member 310 and the upper end of the lower thermal bonding member 320. The outer diameter of the separation direction guide pipe 304 is smaller than the inner diameter of the center portion of the reinforcing column 100.

Figure 6:
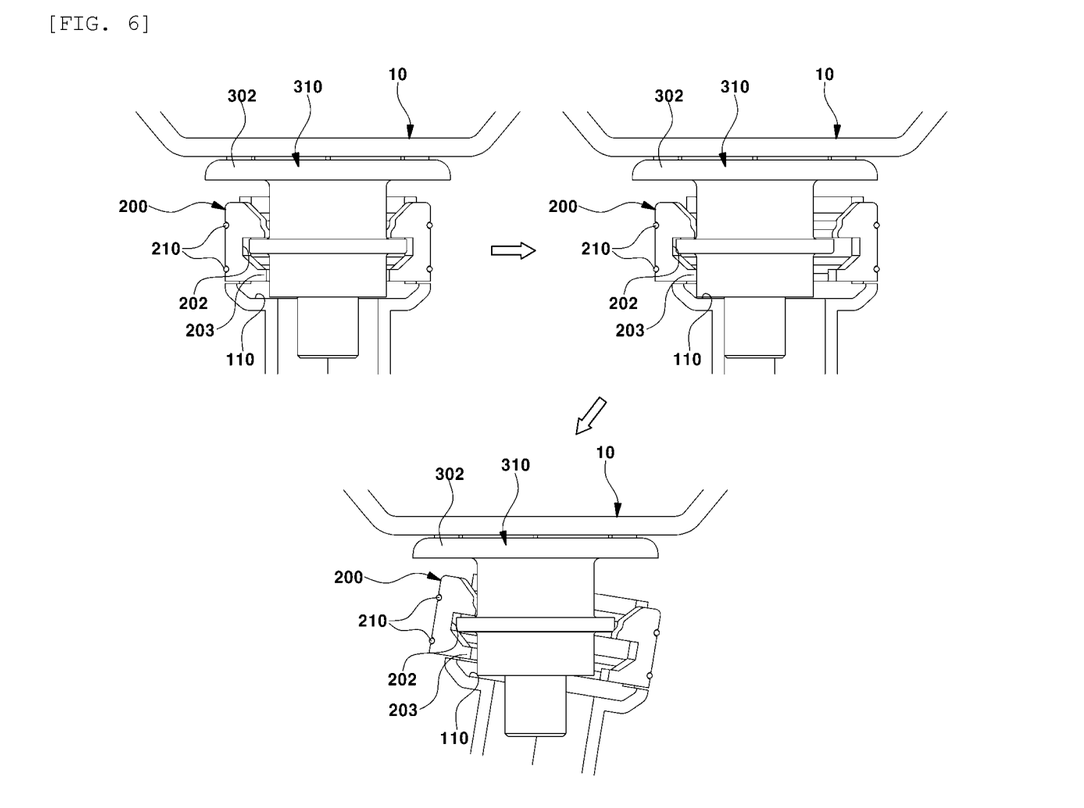
FIG. 6 is a cross-sectional view showing a separation process of the thermal bonding member of the stiffness reinforcement structure for a fuel tank of a vehicle according to an exemplary embodiment of the present disclosure.

Accordingly, as shown in FIG. 6, the horizontal movement distance of the upper thermal bonding member 310 or the lower thermal bonding member 320 may be limited as the distance that the separation direction guide pipe 304 moves until it reaches the inner side of the center portion of the reinforcing column 100.

Further, the horizontal movement distance of the reinforcing column 100 may be limited as the distance that the inner side of the center portion of the reinforcing column 100 moves until it reaches the separation direction guide pipe 304.

Figure 5:
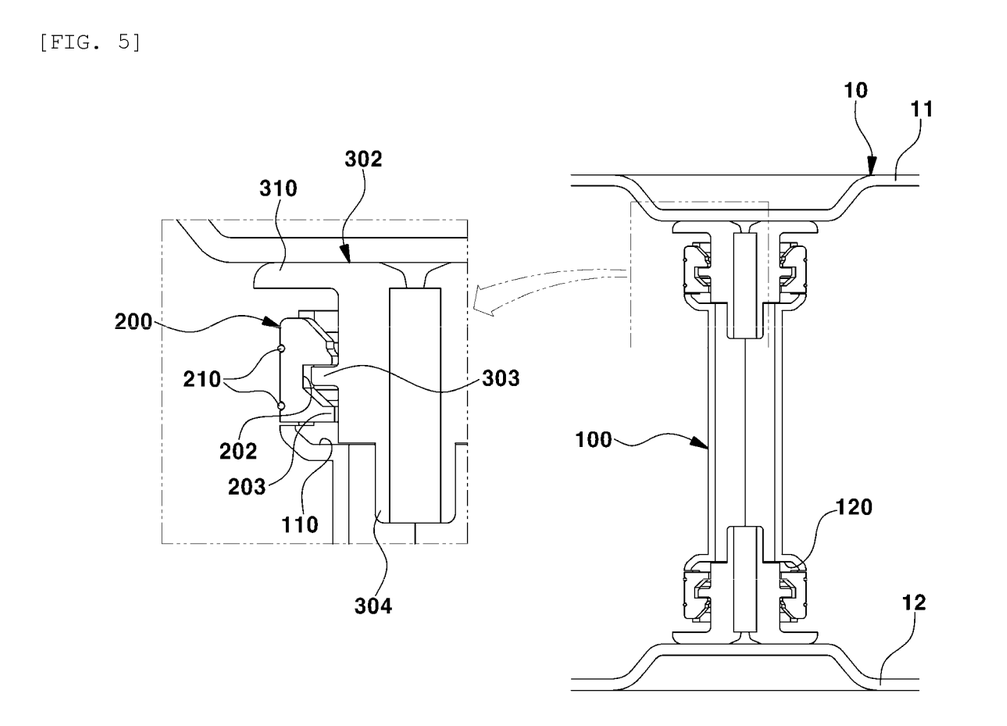
FIG. 5 is an assembled cross-sectional view showing the stiffness reinforcement structure for a fuel tank of a vehicle according to an exemplary embodiment of the present disclosure.

On the other hand, an upper compression support surface 110 that the bottom edge of the upper thermal bonding member 310 is in close contact with is formed on the inner side of the upper end portion of the reinforcing column 100 and a lower compression support surface 120 that the top edge of the lower thermal bonding member 320 is in close contact with is formed on the inner side of the lower end portion of the reinforcing column 100.

Accordingly, even if external force that is applied from the top of the fuel tank acts on the upper thermal bonding member 310 as compression force, the upper compression support surface 110 of the reinforcing column 100 supports the compression force. Similarly, even if external force that is applied from the bottom of the fuel tank acts on the lower thermal bonding member 320, the lower compression support surface 120 of the reinforcing column 100 supports the compression force.

As described above, even if external force is applied to the fuel tank, the reinforcing column 100 functions as a stiff support for preventing deformation of the fuel tank.

An assembly process of the stiffness reinforcement structure for a fuel tank of a vehicle according to the present disclosure is described hereafter.

First, the hooks 103 formed at the first body 101 are inserted into the hook coupling holes 104 formed at the second body 102 and the hooks 103 formed at the second body 102 are inserted into the hook coupling holes 104 formed at the first body 101, thereby the reinforcing column 100 having a cylindrical structure is prepared.

The sliders 200 are fastened to the side openings 107 of the reinforcing column 100.

That is, the guide protrusions 201 of the sliders 201 are horizontally movably fastened to the horizontal guide grooves 109 formed at the side openings 107.

Next, the springs 210 are inserted into the spring insertion grooves 212 formed on the outer sides of the reinforcing column 100 and the sliders 200, so that the reinforcing column 100 and the sliders 200 are bound in a single unit by elastic compression force of the springs 210.

Figure 3:
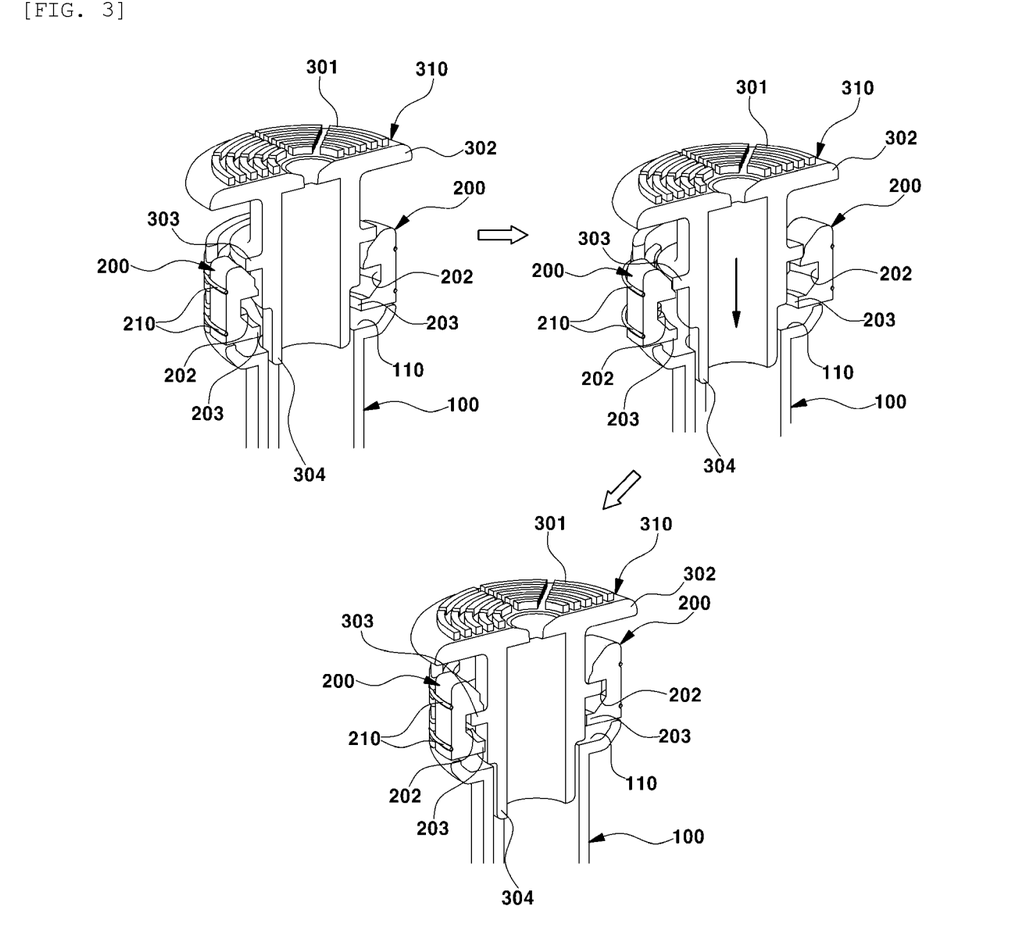
FIG. 3 is a perspective view showing a process of assembling a thermal bonding member of the stiffness reinforcement structure for a fuel tank of a vehicle according to an exemplary embodiment of the present disclosure.

Next, as shown in FIG. 3, the upper thermal bonding member 310 is inserted through the upper opening 105 of the reinforcing column 100, thereby being fastened to corresponding sliders 200.

In more detail, as shown in FIG. 3, the upper thermal bonding member 310 is fastened to the sliders 200 through a process of inserting the upper thermal bonding member 310 through the upper opening 105 of the reinforcing column 100, a process in which the fastening flange of the upper thermal bonding member 310 presses the sliders 200, a process in which the sliders 200 moves a predetermined distance rearward while extending the springs 210 and the fastening flange 303 is inserted into the fastening groove 202 of the sliders 200, and a process in which the sliders 200 are moved forward to the initial positions by elastic restoring force of the springs 210.

Though not shown in FIG. 3, the lower thermal bonding member 320 can be fastened to corresponding sliders 200 by being inserted through the lower opening 106 of the reinforcing column 100 in the same way.

As described above, the fastening flanges 303 are circumferentially formed on the upper thermal bonding member 310 and the lower thermal bonding member 320, whereby assembly of the upper thermal bonding member 310 and the lower thermal bonding member 320 to the reinforcing column 100 is finished.

In this state, the elastic compression force of the springs 210 wound around the outer sides of the reinforcing column 100 and the sliders 200 is applied to the sliders 200, so that the separation induction protrusions 203 of the sliders 200 are in close contact with the outer sides of the upper thermal bonding member 310 and the lower thermal bonding member 320.

Further, the bottom edge of the upper thermal bonding member 310 is in close contact with the upper compression support surface 110 of the reinforcing column 100 and the top edge of the lower thermal bonding member 320 is in close contact with the lower compression support surface 120 of the reinforcing column 100.

Figure 4:
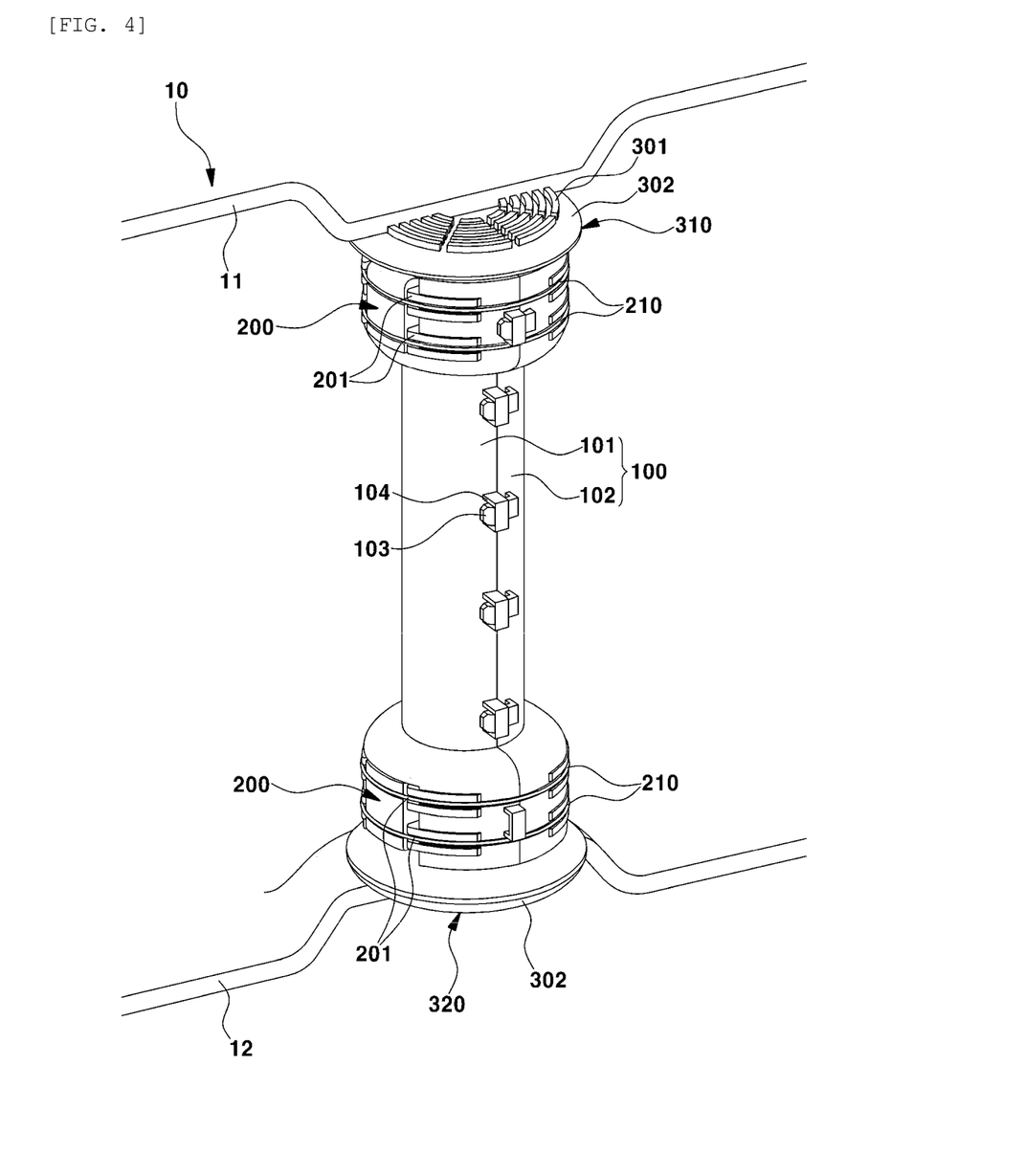
FIG. 4 is an assembled perspective view showing the stiffness reinforcement structure for a fuel tank of a vehicle according to an exemplary embodiment of the present disclosure.

Next, as shown in FIGS. 4 and 5, the upper thermal bonding member 310 and the lower thermal bonding member 320 are thermally bonded to the inner sides of the fuel tank 100.

For example, the thermal bonding protrusions 301 formed on the top of the thermal bonding plate 302 of the upper thermal bonding member 310 are brought in close contact with the inner side of the top plate 11 of the fuel tank 10 and then thermally bonded using a method such as thermal bonding or ultrasonic thermal bonding, whereby the upper thermal bonding member 310 is integrated with the top plate 11 of the fuel tank 10.

Similarly, the thermal bonding protrusions 301 formed on the bottom of the thermal bonding plate 302 of the lower thermal bonding member 320 are brought in close contact with the inner side of the bottom plate 12 of the fuel tank 10 and then thermally bonded using a method such as thermal bonding or ultrasonic thermal bonding, whereby the lower thermal bonding member 320 is integrated with the bottom plate 12 of the fuel tank 10.

Accordingly, even if external force that is applied from the top of the fuel tank 10 acts on the upper thermal bonding member 310 as compression force, the upper compression support surface 110 of the reinforcing column 100 supports the compression force. Similarly, even if external force that is applied from the bottom of the fuel tank 10 acts on the lower thermal bonding member 320, the lower compression support surface 120 of the reinforcing column 100 supports the compression force. Consequently, the reinforcing column 100 functions as a stiff support for preventing deformation of the fuel tank 10.

The operational flow of the stiffness reinforcement structure for a fuel tank of a vehicle assembled as described above is described hereafter.

FIG. 6 is a cross-sectional view showing a separation process of the thermal bonding assembly of the stiffness reinforcement structure for a fuel tank of a vehicle according to an exemplary embodiment of the present disclosure.

When a large shock such as a car collision is applied to the fuel tank 10 made of plastic, the fuel tank 10 is deformed and the shock can be transmitted to the reinforcing column 100.

In this case, when the shock according to deformation of the fuel tank 10 is transmitted to the upper thermal bonding member 310 or the lower thermal bonding member 320 integrally thermally bonded to the fuel tank 10, the upper thermal bonding member 310 or the lower thermal bonding member 320 is horizontally moved in the reinforcing column 100.

Further, the upper thermal bonding member 310 or the lower thermal bonding member 320 pushes outward the slider 200 at a side while horizontally moving, so that the slider 200 at a side horizontally moves outward while extending corresponding springs 210.

In this process, since the separation induction protrusions 203 of the sliders 200 are in close contact with the outer sides of the upper thermal bonding member 310 and the lower thermal bonding member 320, the slider 200 at a side easily horizontally moves outward while extending the springs 210.

Further, the fastening flange 303 of the upper thermal bonding member 310 or the lower thermal bonding member 320 is pulled and separated out of the fastening groove 202 formed on the slider 200 at the other side, so that the upper thermal bonding member 310 is separated from the reinforcing column 100 or the lower thermal bonding member 320 is separated from the reinforcing column 100.

As described above, when a large shock such as a car collision is applied to the fuel tank 100 and shock is transmitted to the reinforcing column 100 with deformation of the fuel tank 10, the sliders 200 are separated and the reinforcing column 100 that is vertically installed is induced to incline. The upper thermal bonding member 310 and the lower thermal bonding member 320 can maintain the thermal bond to the top plate 11 and the bottom plate 12 of the fuel tank 10, respectively.

Further, since the upper thermal bonding member 310 and the lower thermal bonding member 320 keep thermally bonded to the top plate 11 and the bottom plate 12 of the fuel tank 10 with shock (bursting pressure) such as a car collision applied, it is possible to easily prevent the problem of oil leakage at thermal bonding portions of a fuel tank due to bursting in the related art.

Figure 7:
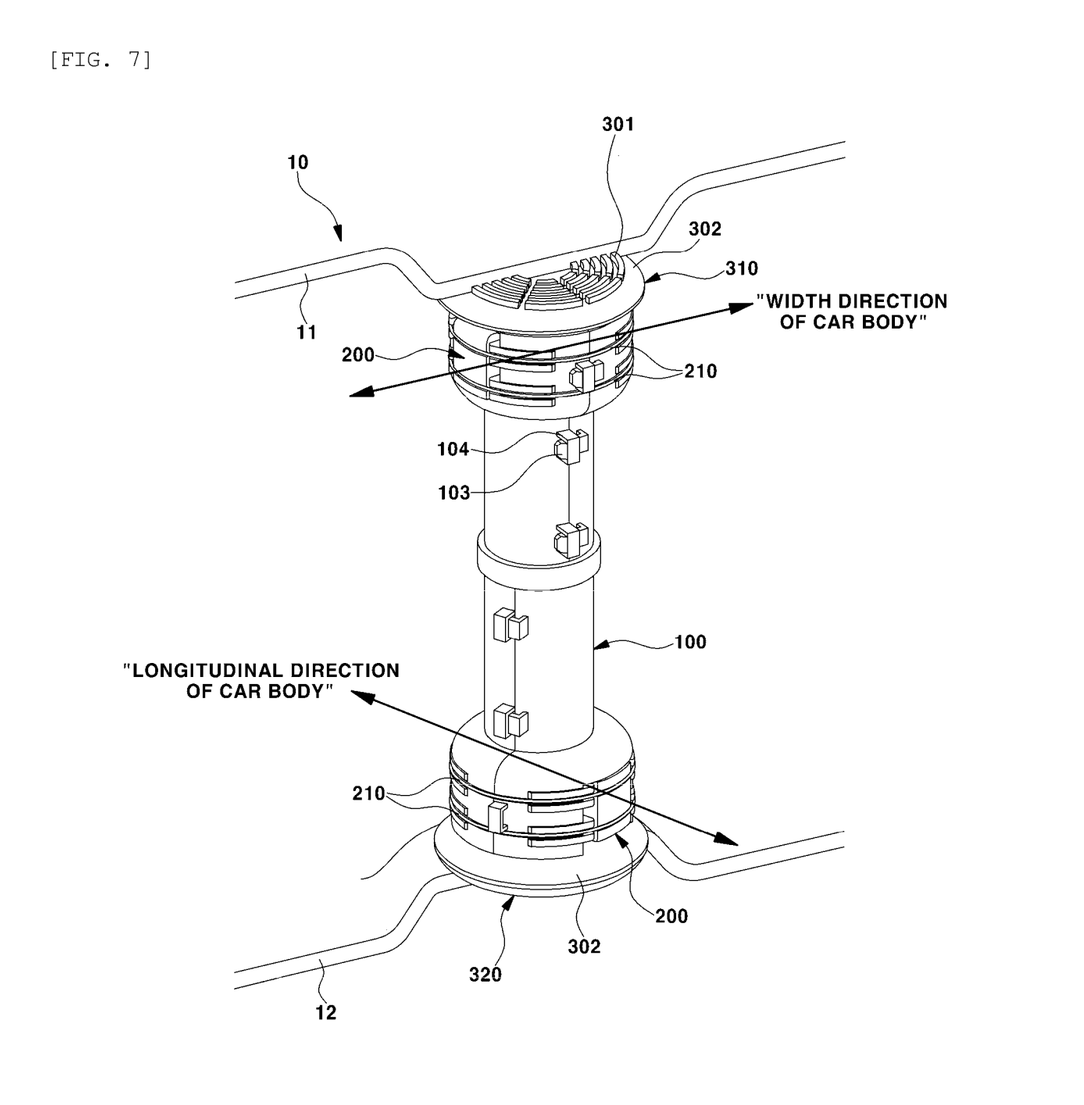
FIG. 7 is a cross-sectional perspective view showing another exemplary embodiment of a stiffness reinforcement structure for a fuel tank of a vehicle according to the present disclosure.

FIG. 7 is a cross-sectional perspective view showing another exemplary embodiment of a stiffness reinforcement structure for a fuel tank of a vehicle.

Another exemplary embodiment of the present disclosure is characterized in that even though not only shock due to a left-right car collision, but shock due to a front-rear car collision is transmitted to the reinforcing column 100, the reinforcing column 100 that has been vertically installed can be easily induced to incline.

To this end, the reinforcing column 100 is provided in a vertical assembly type, the side openings 107 formed at both sides of the upper end of the reinforcing column 100 are open to the left and right, and the side openings 107 formed at both sides of the lower end of the reinforcing column 100 are open to the front and rear.

Further, the sliders 200 fastened to the side openings 107 that are open to the left and right can move left and right in a collision, and the sliders 200 fastened to the side openings 107 that are open to the front and rear can move forward and rearward in a collision.

Accordingly, in a left-right car collision, the sliders 200 fastened to the side openings 107 that are open to the left and right can induce separation from the upper thermal bonding member 310 while horizontally moving due to shock. Further, in a front-rear car collision, sliders 200 fastened to the side openings 107 that are open to the front and rear can induce separation from the lower thermal bonding member 320 while horizontally moving due to shock.

As described above, in a left-right car collision, the reinforcing column 100 that has been vertically installed can be induced to incline while the upper end is separated, or in a front-rear car collision, the reinforcing column 100 that has been vertically installed can be induced to incline while the lower end is separated. Accordingly, it is possible to keep the upper thermal bonding member 310 and the lower thermal bonding member 320 thermally bonded respectively to the top plate 11 and the bottom plate 12 of the fuel tank 10. Therefore, it is possible to easily prevent the problem of oil leakage at thermal bonding portions of a fuel tank due to bursting in the related art.

What is claimed is:

1. A stiffness reinforcement structure for a fuel tank of a vehicle, the stiffness reinforcement structure comprising:
   a reinforcing column having an upper opening and a lower opening respectively arranged at an upper portion and a lower portion thereof, and having side openings arranged at both sides of an upper end and both sides of a lower end thereof;
   sliders horizontally movably fastened to the side openings of the reinforcing column;

an upper thermal bonding member inserted in the upper opening of the reinforcing column and fastened to corresponding sliders with a top portion thermally bonded to an inner side of the fuel tank;

a lower thermal bonding member inserted in the lower opening of the reinforcing column and fastened to corresponding sliders with a bottom thermally bonded to an inner side of the fuel tank; and springs wound around outer sides of the reinforcing column and the sliders and providing elastic compression force to the upper thermal bonding member and the lower thermal bonding member through the sliders.

2. The stiffness reinforcement structure of claim 1, wherein the reinforcing column includes a first body and a second body that have a semicircular cross-section and are fastened to each other, and wherein pluralities of hooks and hook fastening holes for coupling are integrally arranged at the first body and the second body.

3. The stiffness reinforcement structure of claim 1, wherein a plurality of horizontal guides vertically spaced apart from each other is arranged on both sides of the side openings of the reinforcing column, and wherein horizontal guide grooves for horizontal movement of the sliders are respectively arranged between the horizontal guides.

4. The stiffness reinforcement structure of claim 3, wherein guide protrusions that are slidably inserted in the horizontal guide grooves are arranged on both outer sides of the sliders.

5. The stiffness reinforcement structure of claim 1, wherein fastening grooves for fastening to the upper thermal bonding member and the lower thermal bonding member are formed on inner sides of the sliders.

6. The stiffness reinforcement structure of claim 5, wherein fastening flanges inserted in the fastening grooves are formed around the upper thermal bonding member and the lower thermal bonding member.

7. The stiffness reinforcement structure of claim 5, wherein separation induction protrusions being in close contact with outer sides of the upper thermal bonding member and the lower thermal bonding member are formed on the inner sides under the fastening grooves of the sliders.

8. The stiffness reinforcement structure of claim 1, wherein a thermal bonding plate for thermal bonding to the fuel tank is formed at an upper end of the upper thermal bonding member, and a thermal plate for thermal bonding to the fuel tank is formed at a lower end of the lower thermal bonding member.

9. The stiffness reinforcement structure of claim 1, wherein the side openings formed at both sides of the upper end of the reinforcing column are open in a left and right direction, and the side openings formed at both sides of the lower end of the reinforcing column are open to a front and rear.

10. The stiffness reinforcement structure of claim 9, wherein the sliders fastened to the side openings move in the left and right direction during a collision, and the sliders fastened to the side openings that are open to the front and rear move in a forward and rearward direction during a collision.

11. The stiffness reinforcement structure of claim 1, wherein spring insertion grooves in which the spring is inserted are arranged around the outer sides of the reinforcing column and the sliders.

12. The stiffness reinforcement structure of claim 1, wherein an upper compression support surface that a bottom edge of the upper thermal bonding member is in close contact with is formed on an inner side of an upper end portion of the reinforcing column, and wherein a lower compression support surface that a top edge of the lower thermal bonding member is in close contact with is formed on an inner side of a lower end portion of the reinforcing column.

13. The stiffness reinforcement structure of claim 1, wherein a separation direction guide pipe extending inside a center portion of the reinforcing column is arranged on each of a bottom of the upper compression support and a top of the lower compression support, and wherein an outer diameter of the separation direction guide pipe is smaller than an inner diameter of the center portion of the reinforcing column.

* * * * *